US 12,500,964 B2

(12) United States Patent
Tsuchiya et al.

(10) Patent No.: US 12,500,964 B2
(45) Date of Patent: Dec. 16, 2025

(54) COMMUNICATION SYSTEM, ELECTRONIC CONTROL DEVICE, AND COMMUNICATION METHOD (71) Applicant: Hitachi Astemo, Ltd., Hitachinaka (JP)

(72) Inventors: Ryo Tsuchiya, Hitachinaka (JP); Kazuyoshi Serizawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 463 days.

(21) Appl. No.: 17/767,636

(22) PCT Filed: Sep. 8, 2020

(86) PCT No.: PCT/JP2020/033884
§ 371 (c)(1),
(2) Date: Jan. 11, 2024

(87) PCT Pub. No.: WO2021/070536
PCT Pub. Date: Apr. 15, 2021

(65) Prior Publication Data
US 2024/0340358 A1 Oct. 10, 2024

(30) Foreign Application Priority Data
Oct. 8, 2019 (JP) .................. 2019-185234

(51) Int. Cl.
*H04L 12/24* (2006.01)
*H04L 41/0803* (2022.01)
(Continued)

(52) U.S. Cl.
CPC .............. *H04L 69/08* (2013.01); *H04L 61/45* (2022.05); *H04L 67/12* (2013.01)

(58) Field of Classification Search
CPC ......... H04L 69/08; H04L 61/45; H04L 67/12; H04L 12/40189; H04L 12/40195;
(Continued)

(56) References Cited

U.S. PATENT DOCUMENTS 6,135,163 A 10/2000 Wahhoud et al.
9,438,680 B1 * 9/2016 Bingham, Jr. .......... H04L 67/51
(Continued)

FOREIGN PATENT DOCUMENTS

CN 111107039 A * 5/2020
JP 2000-212861 A 8/2000
(Continued)

OTHER PUBLICATIONS

Extended European Search Report issued in European Application No. 20874091.0 dated Sep. 21, 2023 (7 pages).
(Continued)

*Primary Examiner* — Moustafa M Meky
*Assistant Examiner* — Elizabeth Kassa
(74) *Attorney, Agent, or Firm* — Crowell & Moring LLP (57) ABSTRACT A communication system and so forth that can improve the throughput are provided. The communication system includes a server 1A (first server), another server 1B (second server), and a client 2. The server 1B transmits server information (second server information) indicative of an address of the server 1B to the client 2 through a non-IP communication channel. The client 2 includes a service registry 114C (registry) into which the server information transmitted from the server 1B is stored. The client 2 acquires the server information from the service registry 114C and requests the server 1B corresponding to the address indicated by the server information for a service to be provided by the server 1B.

8 Claims, 8 Drawing Sheets (51) Int. Cl.
*H04L 61/45* (2022.01)
*H04L 67/12* (2022.01)
*H04L 69/08* (2022.01)

(58) Field of Classification Search
CPC ....... H04L 67/565; H04L 67/10; H04L 69/40; H04L 2012/40215; H04L 2012/40273
USPC .......................................... 709/223
See application file for complete search history.

(56) References Cited

U.S. PATENT DOCUMENTS

| | | | | |
|---|---|---|---|---|
| 2003/0167343 | A1* | 9/2003 | Furuno | H04L 65/80 709/244 |
| 2004/0030740 | A1* | 2/2004 | Stelting | H04L 67/10 709/201 |
| 2006/0159097 | A1 | 7/2006 | Shah et al. | |
| 2012/0011224 | A1* | 1/2012 | Casey | H04L 65/611 709/219 |
| 2012/0131090 | A1* | 5/2012 | Doddavula | G06F 16/27 709/203 |
| 2016/0142369 | A1* | 5/2016 | Jiang | H04L 69/28 709/223 |
| 2018/0062988 | A1* | 3/2018 | Sikaria | H04L 12/4633 |
| 2020/0053125 | A1* | 2/2020 | Ngo | H04L 9/088 |
| 2020/0120064 | A1* | 4/2020 | Cho | H04L 61/5007 |
| 2020/0177654 | A1* | 6/2020 | Mittal | H04L 65/611 |
| 2021/0105198 | A1* | 4/2021 | Pandey | H04L 1/1671 |

FOREIGN PATENT DOCUMENTS

| | | |
|---|---|---|
| JP | 2000-236348 A | 8/2000 |
| JP | 2011-118593 A | 6/2011 |
| JP | 2011-520395 A | 7/2011 |
| JP | 2012-80274 A | 4/2012 |

OTHER PUBLICATIONS

International Search Report (PCT/ISA/210) issued in PCT Application No. PCT/JP2020/033884 dated Dec. 28, 2020 with English translation (five (5) pages).
Japanese-language Written Opinion (PCT/ISA/237) issued in PCT Application No. PCT/JP2020/033884 dated Dec. 28, 2020 (eight (8) pages).

* cited by examiner

| No. | IP COMMUNICATION SYSTEM |
|---|---|
| 1 | Ethernet |
| 2 | TCP/IP |
| 3 | UDP/IP |

FIG.2B

| No. | NON-IP COMMUNICATION SYSTEM |
|---|---|
| 1 | PCIe |
| 2 | SPI |
| 3 | CAN |

| No. | SERVICE |
|---|---|
| 1 | SENSOR INFORMATION ACQUISITION |
| 2 | SENSOR INFORMATION CONVERSION |
| 3 | SMOOTHING |

COMMUNICATION SYSTEM, ELECTRONIC CONTROL DEVICE, AND COMMUNICATION METHOD

TECHNICAL FIELD

The present invention relates to a communication system, an electronic control device, and a communication method.

BACKGROUND ART

In an in-vehicle system, not only an Internet Protocol device (IP device) but also a non-IP device is used for in-vehicle communication. In an automatic driving system, "service-oriented communication" is adopted in which a function of software that corresponds to one process is regarded as a service and the service is caused to be linked with the other one on a network.

However, the service-oriented communication is compatible only with IP devices and has a problem in that it cannot be used by non-IP devices. In order to solve this problem, there is such a method, as a conventional technique, that a process for performing data conversion and response to a request is provided between a non-IP device and an IP device.

PRIOR ART DOCUMENT

Patent Document

Patent Document 1: JP-2000-212861-A

SUMMARY OF THE INVENTION

Problem to be Solved by the Invention

However, in Patent Document 1 mentioned above, since the process for performing data conversion and response to a request commonly serves as a relay section between the non-IP device and the IP device, the process has an influence on the processing performance. For example, when data of a sensor connected to the non-IP device is to be sent to the IP device, it is necessary to perform conversion of the data into data for the IP device every time, and this degrades the real-time performance of the data.

It is an object of the present invention to provide a communication system and so forth capable of improving the throughput.

Means for Solving the Problem

In order to achieve the object described above, an example of the present invention is a communication system including a first server, a second server, and a client, in which the second server transmits second server information indicative of an address of the second server to the client through a non-IP communication channel, and the client includes a registry into which the second server information transmitted from the second server is stored, and acquires the second server information from the registry and requests the second server corresponding to the address indicated by the second server information for a service to be provided by the second server.

Advantages of the Invention

According to the present invention, the throughput can be improved. Subjects, configurations, and advantages other than those described above are made clear by the description of embodiments hereinafter described.

MODES FOR CARRYING OUT THE INVENTION

In the following, embodiments of the present invention are described with reference to drawings. It is to be noted that the embodiments described below do not restrict the invention according to the claims and all of various elements and combinations of them described in connection with the embodiments are not necessarily essential to the solving means of the invention.

Further, in the description given below, a process is sometimes described taking a "program" as an action subject. On the other hand, since a processor (for example, a CPU: Central Processing Unit) executes a program to perform processing while using a suitable storage resource (for example, a memory) and/or a communication interface device (for example, a port), it may be said that the entire processes described below are performed, for example, by a processor.

A process described under the assumption that a program is an action subject may be a process performed by a device including a processor. Further, a hardware circuit for exclusive use that performs part or all of processes to be performed by a processor may be included. A computer program may be installed from a program source into the device. The program source may be, for example, a program distribution server or a computer-readable non-transitory recording medium.

First Embodiment

Figure 1:
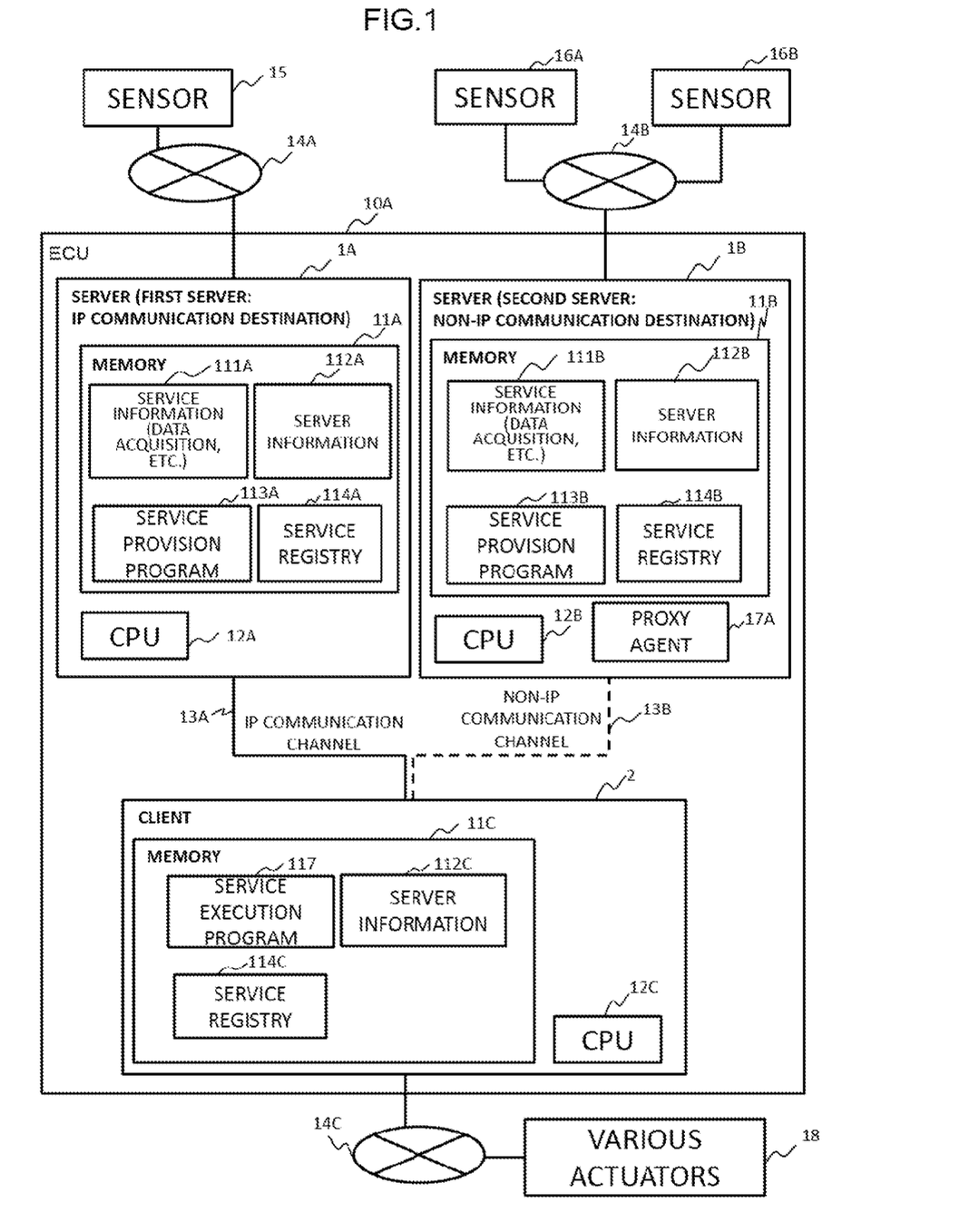
FIG. 1 is a block diagram of a general configuration of a communication system according to a first embodiment.

FIG. 1 is a block diagram of a general configuration of a communication system according to a first embodiment. The communication system of FIG. 1 is a system incorporated in a vehicle such as an automobile and includes sensors 15, 16A, and 16B, various actuators 18, and an ECU 10A (electronic control device). It is to be noted that the ECU 10A (electronic control device) is configured, for example, from a processor such as a CPU, a storage device such as a memory, and a communication device such as inputting/outputting circuits.

The sensor 15 is communicatable with the ECU 10A through an in-vehicle network 14A, and the sensors 16A and 16B and the ECU 10A are communicatable with each other through another in-vehicle network 14B. Further, the ECU 10A and the various actuators 18 are communicatable with each other through a further in-vehicle network 14C.

The in-vehicle networks 14A, 14B, and 14C may each be an optional communication network such as the Ethernet (registered trademark) or CAN-FD (CAN with Flexible Data-Rate). It is to be noted that the Ethernet (registered trademark) is a standard for a LAN prescribed by IEEE 802.3, and CAN-FD is an extension of the original CAN protocol prescribed by ISO 11898-1.

Each of the sensors 15, 16A, and 16B includes one or more sensors for fetching information of a vehicle surrounding environment such as a Radar, a LiDAR or a camera. In particular, each of the sensors 15, 16A, and 16B is configured from an optional sensor or sensors for sensing an object around the self-vehicle. The sensor 15 outputs outside world information to the server 1A in the ECU 10A, and the sensors 16A and 16B output outside world information to the server 1B in the ECU 10A.

Each of the various actuators 18 includes one or more actuators for operating an accelerator, a brake, a steering element, or the like for operating traveling of the vehicle. The various actuators 18 control traveling of the vehicle on the basis of input control information (command) from a client 2 in the ECU 10A.

The ECU 10A includes the servers 1A and 1B, client 2, CPUs 12A, 12B, and 12C, and memories 11A, 11B, and 11C. The CPUs 12A, 12B, and 12C execute processes according to programs stored in the memories 11A, 11B, and 11C, respectively.

Each of the memories 11A, 11B, and 11C is, for example, a RAM (RANDOM ACCESS MEMORY), and the memories 11A, 11B, and 11C store programs 113A, 113B, and 117 that are executed by the CPUs 12A, 12B, and 12C, respectively, and necessary information described below.

As the necessary information, service information 111A whose service is possible, server information 112A, a service registry 114A that collectively includes service information that can be provided to the client 2, and a service provision program 113A are stored in the memory 11A of the server 1A connected to the client 2 by IP communication.

In the memory 11B of the server 1B connected to the client 2 by non-IP communication, service information 111B whose service is possible, server information 112B, a service registry 114B that collectively includes service information that can be provided to the client 2, and a service provision program 113B are stored.

In the memory 11C of the client 2, server information 112C of a service provision source, a service registry 114C that collectively includes service information that can be used, and a service execution program 117 are stored. Here, the server information includes an IP address (in a case of non-IP device, a physical address) of a service provision source, a port number, or the like.

It is to be noted that, although the description given below sometimes is a description in which a program is an action subject for the convenience of description, the actual execution subject is the CPU 12A, 12B, or 12C that executes the program.

Meanwhile, the ECU 10A may include an arithmetic element capable of executing various information processes, for example, an FPGA (Field-Programmable Gate Array) in addition to or in place of the CPUs 12A, 12B, and 12C. Further, ECU 10A may include, in addition to a RAM or a ROM, for example, a magnetic storage medium such as a HDD (Hard Disk Drive) or a semiconductor storage medium such as an SSD (Solid State Drive) as the memory 11A, 11B, or 11C.

Figure 2A:
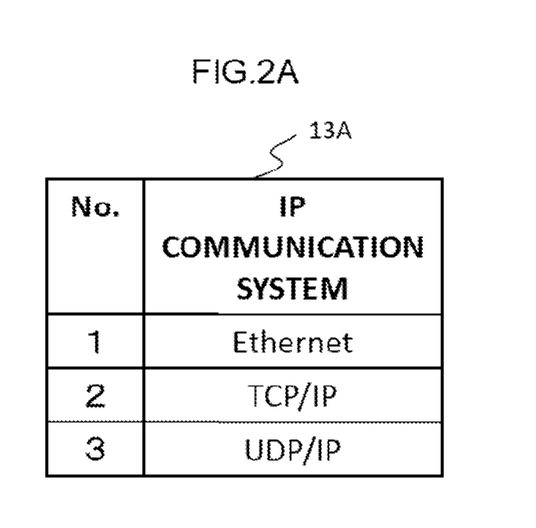
FIG. 2A is a list indicating examples of a communication channel (IP communication system) according to the first embodiment.
Figure 2B:
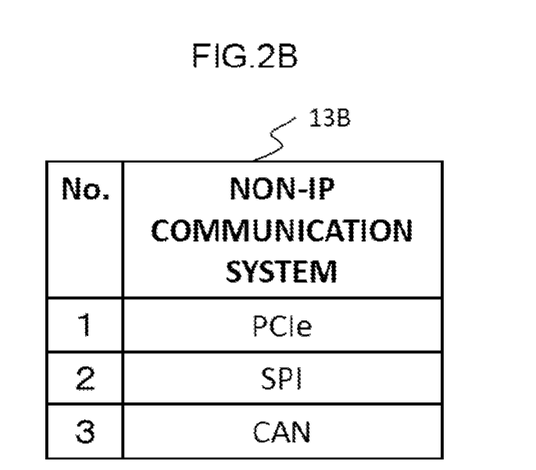
FIG. 2B is a list indicating examples of a communication channel (non-IP communication system) according to the first embodiment.

FIGS. 2A and 2B are lists depicting examples of a communication channel according to the first embodiment.

As the IP communication channel 13A of the ECU 10A of FIG. 1, the Ethernet (registered trademark), TCP (Transmission Control Protocol), UDP (User Datagram Protocol), or the like is used. Meanwhile, as the non-IP communication channel 13B of the ECU 10A of FIG. 1, the PCIe (PCI Express), SPI (Serial Peripheral Interface), CAN (Controller Area Network), or the like is used.

Figure 3A:
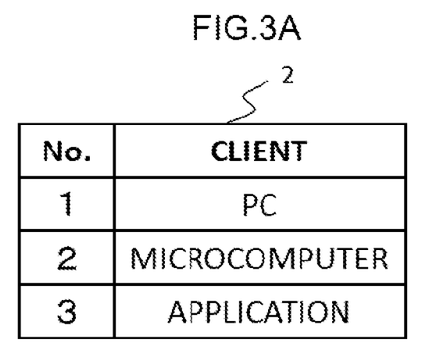
FIG. 3A is a list depicting examples of a client according to the first embodiment.
Figure 3B:
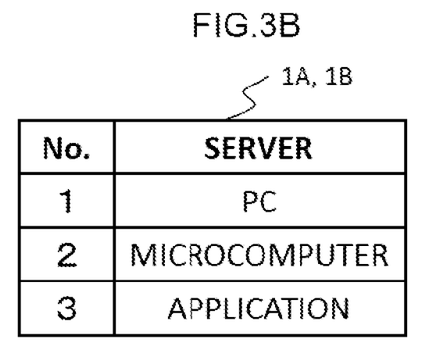
FIG. 3B is a list depicting examples of a server according to the first embodiment.

FIG. 3A is a list depicting examples of the client according to the first embodiment, and FIG. 3B is a list depicting examples of the server according to the first embodiment. As the client 2, a PC, a microcomputer, an application, or the like is used. Further, as each of the servers 1A and 1B, a PC, a microcomputer, an application, or the like is used similarly to the client 2.

Figure 4:
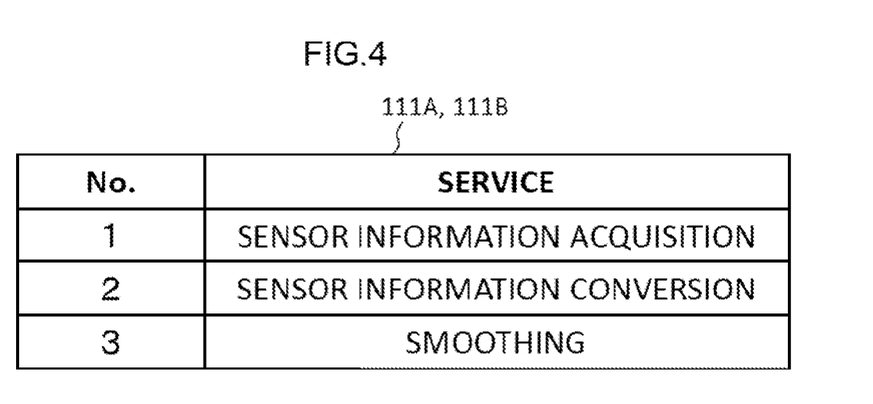
FIG. 4 is a list depicting examples of a service according to the first embodiment.

FIG. 4 is a list depicting examples of service information according to the first embodiment. Sensor information acquisition, sensor information conversion, smoothing, or the like is used as the service information 111A and 111B stored in the memories 11A and 11B of the servers 1A and 1B, respectively.

Now, a communication sequence in the communication system (vehicle control system) of FIG. 1 is described with reference to FIGS. 5 and 6.

Figure 5:
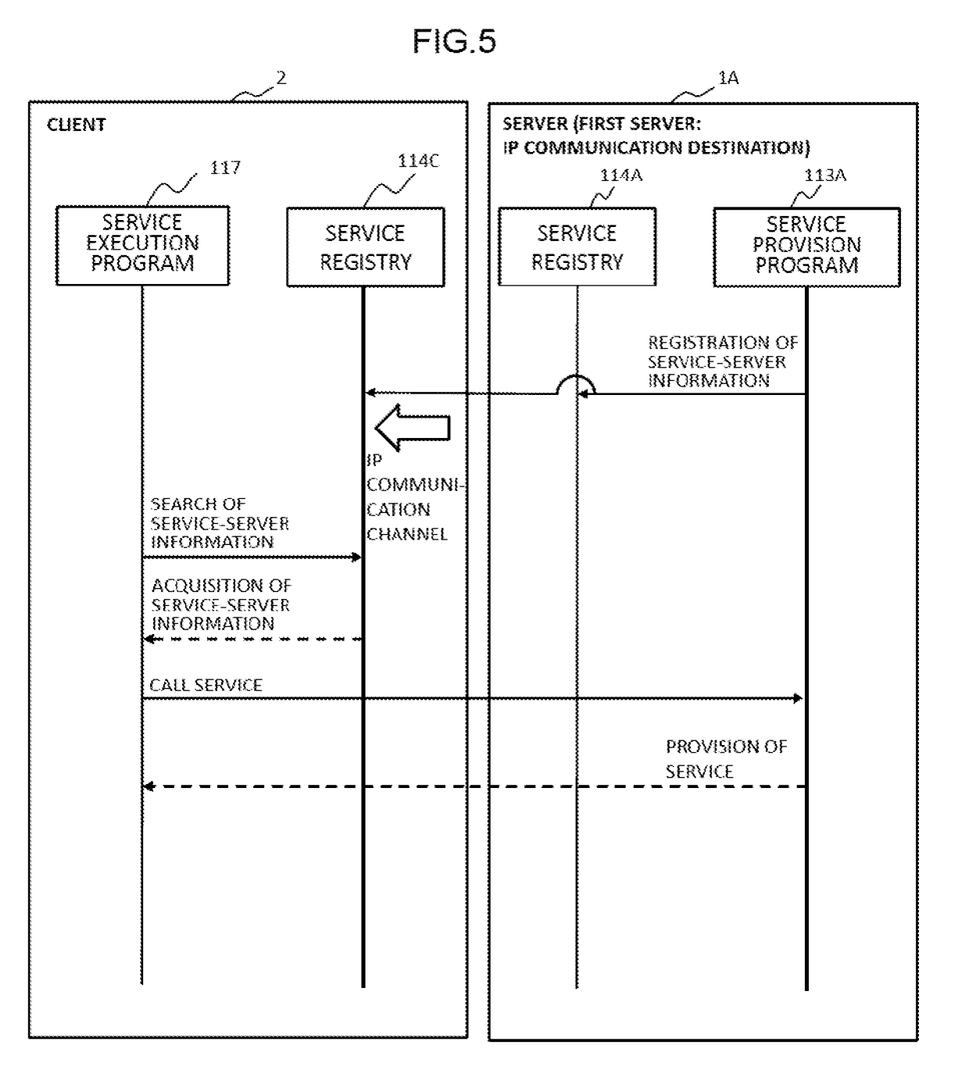
FIG. 5 is a communication sequence diagram with an IP device according to the first embodiment.

FIG. 5 is a communication sequence diagram with an IP device according to the first embodiment.

Although various information in a memory is subject to reading and writing and is transferred through a communication channel under the control of a CPU or the like, details of processing operation are omitted here and flows of data and information are described for the convenience of description.

The service provision program 113A of the server 1A multicasts the service information 111A and the server information 112A and registers (writes) them into the service registry 114A in the server 1A and the service registry 114C in the client 2.

It is to be noted that the service information 111A includes an identifier for identifying a service, and the identifier is, for example, a unique ID (service ID) or a name. The server information 112A includes an IP address and a port number. The service provision program 113A registers such information as just described into the service registry 114C through the IP communication channel 13A.

In other words, the server 1A (first server) transmits server information (first server information) indicative of the IP address of the server 1A to the client 2 through the IP communication channel. The server information (first server information) is stored into the service registry 114C (registry).

Then, the service execution program 117 of the client 2 searches the service information 111A and the server information 112A registered in the service registry 114C to acquire the individual information. Then, the service execution program 117 calls a service corresponding to the acquired service information 111A (service ID) to a port corresponding to the port number of the server 1A corresponding to the server information (IP address).

In other words, the client 2 acquires server information (first server information) from the service registry 114C (registry) and requests the server 1A (first server) corresponding to the IP address indicated by the server information (first server information) for services to be provided by the server 1A.

Consequently, the client can request the first server for a service directly by IP communication and can request the second server for a service directly by non-IP communication.

Then, the service provision program 113A provides the service called from the client 2. According to the present embodiment, service-oriented communication is possible in communication with an IP device in this manner.

Figure 6:
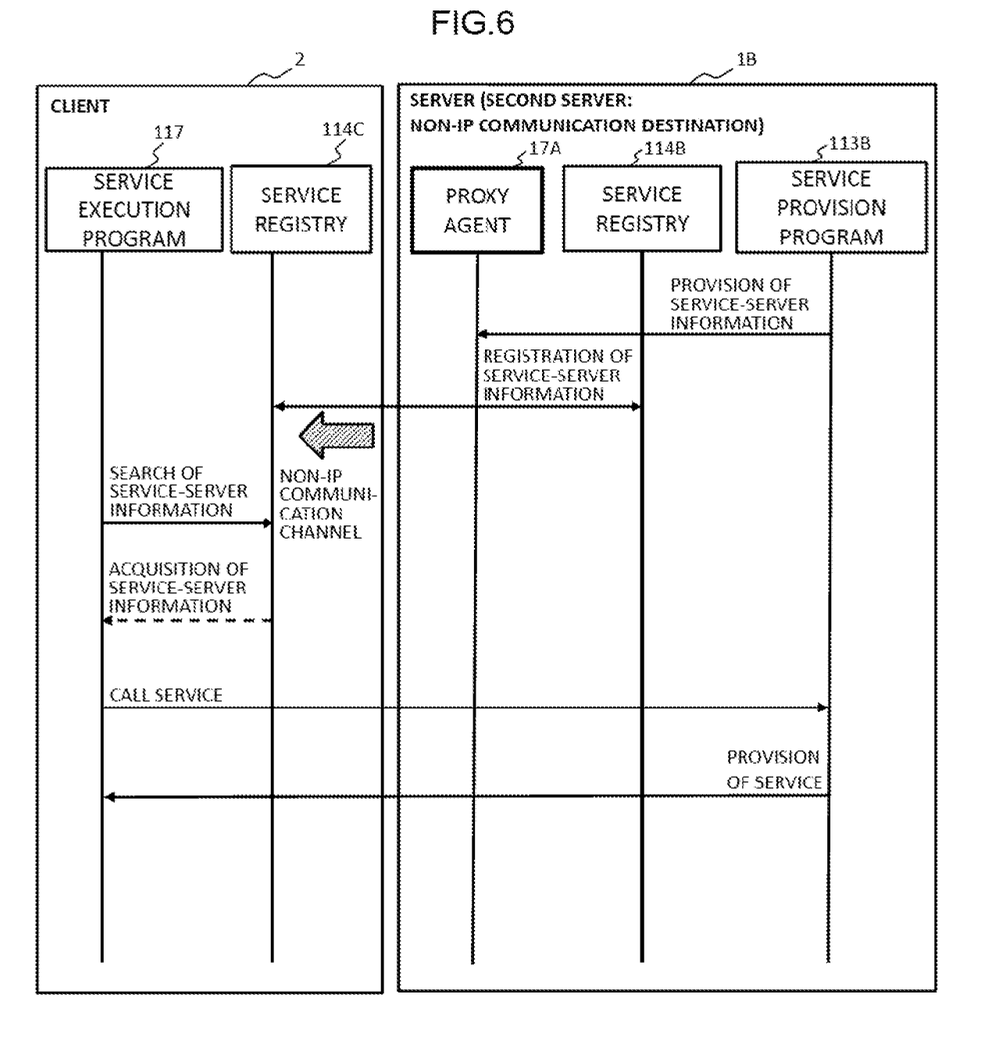
FIG. 6 is a communication sequence diagram with a non-IP device according to the first embodiment.

FIG. 6 is a communication sequence diagram with a non-IP device according to the first embodiment.

The service provision program 113B of the server 1B provides the service information 111B and the server information 112B once to a proxy agent 17A. It is to be noted that the service information 111B includes an identifier for identifying a service, and the identifier is, for example, a unique ID (service ID) or a name. The server information 112B includes a physical address and a port number. The server information 112B is different from the server information 112A in that it includes a physical address in place of an IP address.

The proxy agent 17A registers the information into the service registry 114C through the non-IP communication channel 13B. While the subject of registration into the service registry 114C in FIG. 5 is the service provision program 113A, the subject of registration in FIG. 6 is the proxy agent 17A.

In other words, the communication system includes the server 1A (first server), server 1B (second server), and client 2. The server 1B (second server) transmits server information (second server information) indicative of the address of the server 1B to the client 2 through a non-IP communication channel. The client 2 includes a service registry 114C (registry) into which the server information (second server information) transmitted from the server 1B (second server) is stored.

Meanwhile, the server 1B (second server) transmits service information (second service information) indicative of services to be provided by the server 1B to the client 2 through the non-IP communication channel. The service information (second service information) is stored into the service registry 114C (registry).

In particular, the address indicated by the server information (second server information) is a physical address. Consequently, since the second server information indicative of the physical address of the second server is stored into the registry of the client, the client can request the second server for a service directly by non-IP communication.

The proxy agent 17A registers the service information 111B and the server information 112B into the service registry 114C in the client 2 through the non-IP communication channel 13B. Simultaneously, the proxy agent 17A registers the service information 111B and the server information 112B also into the service registry 114B in the server 1B.

Then, the service execution program 117 of the client 2 searches the service information 111B and the server information 112B registered in the service registry 114C to acquire the individual information. Then, the service execution program 117 calls a service corresponding to the acquired service information 111B (service ID) to a port corresponding to the port number of the server 1B corresponding to the server information (physical address). Then, the service provision program 113B provides the service called from the client 2.

In other words, the client 2 acquires server information (second server information) from the service registry 114C (registry) and requests the server 1B (second server) corresponding to the address indicated by the server information (second server information) for the service to be provided by the server 1B.

Consequently, the client can directly request the second server for a service using the second server information acquired from the registry. Since the client requests a service without the intervention by a relay device, a problem of delay in routing of a relay device does not occur. Since the throughput of the communication system is improved, the communication system of the present embodiment is preferable, for example, for automatic driving and advanced driver assistance systems.

Further, the server information (second server information) includes a port number, and the client 2 requests a port corresponding to the port number of the server 1B (second server) for a service. Consequently, a service can be requested for each of the ports of the second server.

Further, the client 2 acquires service information (second service information) from the service registry 114C (registry) and requests the server 1B (second server) corresponding to the physical address (address) indicated by the server information (second server information) for the service indicated by the service information (second service information). Consequently, the client can request the second server directly for a service indicated by the second service information using the second service information acquired from the registry.

In particular, the server 1A (first server) is connected to a sensor 25 (first sensor) that performs IP communication and provides a service about an output value of the sensor 25 (first sensor). Meanwhile, the second server is connected to the sensor 16A or 16B (second sensor) that performs non-IP communication and provides a service about an output value of the sensor 16A or 16B (second sensor). Consequently, the client can utilize an output value of the first sensor that performs IP communication and can utilize an output value of the second sensor that performs non-IP communication.

In the present embodiment, the proxy agent 17A is provided additionally to the server 1B of a non-IP device in this manner such that a process for registering the service information 111B and the server information 112B into the service registry 114B (114C) is executed. Consequently, since communication can be performed many times without the intervention of a proxy agent, service-oriented communication also with a non-IP communication device can be performed without degrading the real time property of data. As described above, according to the present embodiment, the throughput of the communication system can be improved.

Second Embodiment

Figure 7:
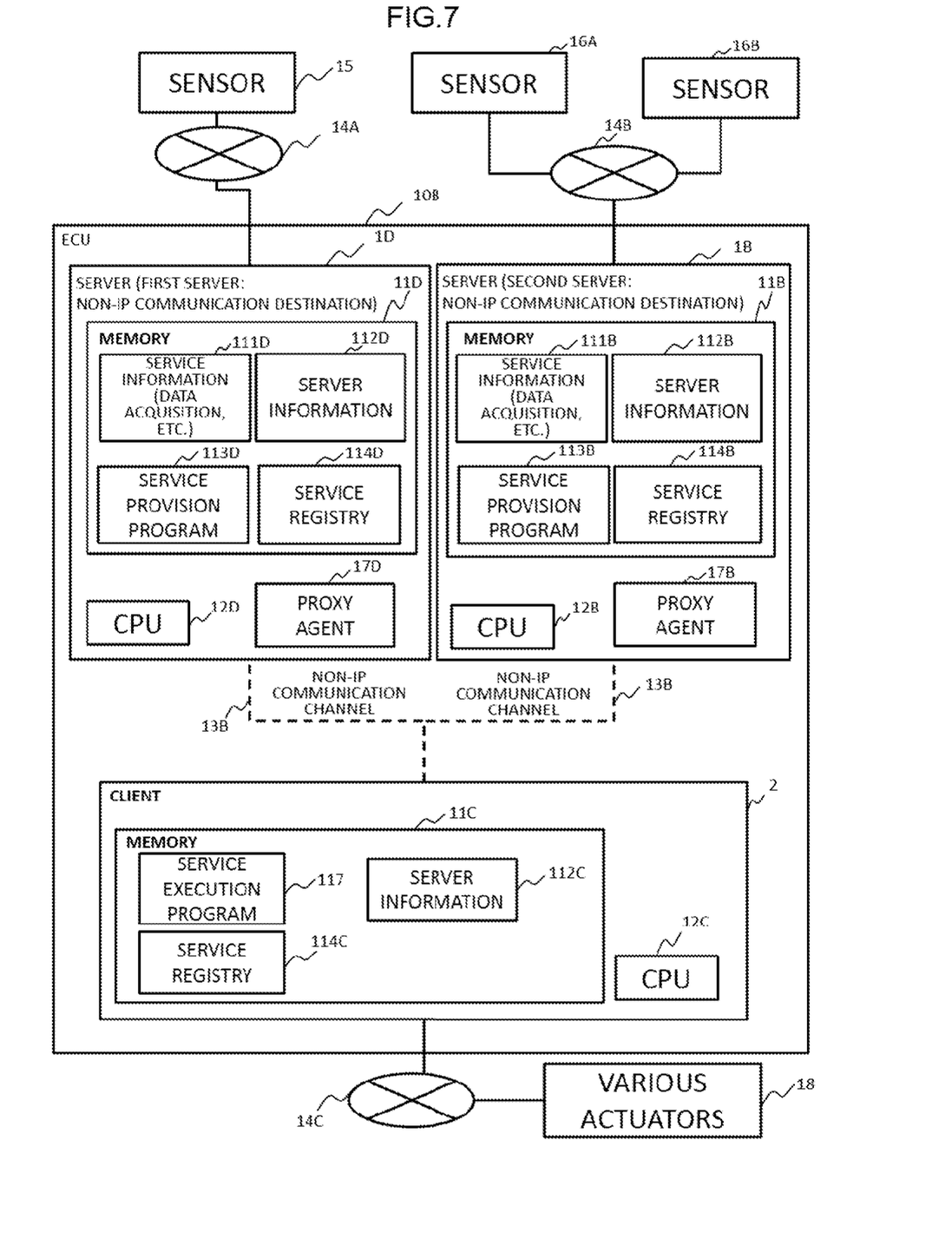
FIG. 7 is a block diagram of a general configuration of a communication system according to a second embodiment.

FIG. 7 is a block diagram of a general configuration of a communication system according to a second embodiment. In the following description, like components to those of the first embodiment described hereinabove are denoted by like reference characters, and description of them is simplified.

In the communication system of FIG. 7, an ECU 10B that is a vehicle controller is different from the ECU 10A according to the first embodiment in that both a server 1D and the server 1B are connected to the client by a non-IP communication channel. Similarly, as in the first embodiment, proxy agents 17B and 17D are provided to the server 1D and the server 1B that are connected to each other by the non-IP communication channel, respectively.

In particular, for example, the server 1D (first server) transmits server information (first server information) indicative of a physical address of the server 1D to the client 2 through the non-IP communication channel. The server information (first server information) is stored into the service registry 114C (registry). The client 2 acquires the server information (first server information) from the service registry 114C and requests the server 1D (first server) corresponding to the physical address indicated by the server information (first server information) for a service to be provided by the server 1D.

Consequently, the client can request the first server and the second server for a service directly by non-IP communication. Since the client requests the first server and the second server, which perform non-IP communication for a service, without the intervention of a relay device, the real time property can be improved.

Further, also in a server that is connected only by a non-IP communication channel, service-oriented communication is possible similarly.

Figure 8:
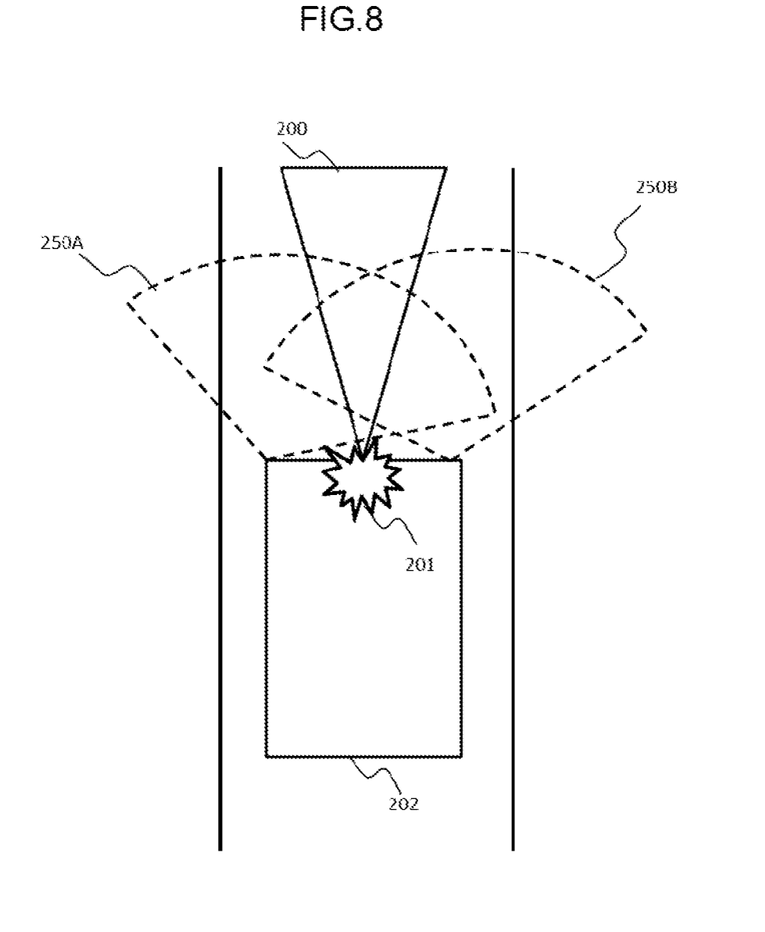
FIG. 8 is a view illustrating server switching when a sensor failure occurs in the first embodiment and the second embodiment.

FIG. 8 is a view (schematic view) illustrating server switching at the time of occurrence of a sensor failure according to the first embodiment and the second embodiment.

A vehicle 202 has a front camera 200 and front side cameras 250A and 250B incorporated therein. The sensor 15 connected to the server on the IP communication channel in the first embodiment is the front camera 200, and the sensors 16A and 16B connected to the server on the non-IP communication channel are the front side cameras 250A and 250B, respectively.

For example, where the front camera 200 suffers from a failure 201 in the first embodiment, the front side cameras 250A and 250B connected to the server of the non-IP communication channel take a role of the front camera 200 as described hereinabove.

Further, in the second embodiment, both the front camera 200 and the front side cameras 250A and 250B are connected to a server on the non-IP communication channel. Also in this case, where the front camera 200 suffers from a failure 201 similarly as described above, the front side cameras 250A and 250B take a role of the front camera 200.

Here, the server 1D (first server) and the server 1B (second server) may have the same functions, and the server 1B (second server) may transmit second server information to the client 2 through the non-IP communication channel at a timing at which failure of the server 1D (first server) is detected. The client 2 requests the server 1B (second server) for a service when the service is not provided from the server 1D (first server).

Consequently, the redundancy of the communication system can be assured, and even if the first server fails, service-oriented communication can be continued. As a result, the reliability of the communication system can be improved.

It is to be noted that the present invention is not limited to the embodiments described above and includes various modifications. For example, the embodiments described above are described in detail in order to explain the present invention so as to be easily understood and the present invention shall not necessarily be restricted to those that include all configurations described hereinabove. Further, it is possible to replace part of the configurations of a certain embodiment with configurations of another embodiment, and also it is possible to add configurations of another embodiment to configurations of a certain embodiment. Further, for part of configurations of each embodiment, removal, or addition of or replacement with a different configuration is possible.

In the embodiments described above, for example, the communication system may be accommodated in one housing. This makes it easy, for example, to save the space. Further, the first server, second server, and client configuring the communication system may be accommodated in individually different housings. This can improve, for example, the degree of freedom in layout.

Each of the first server, second server, and client is configured, for example, from a microcomputer. A board on which the microcomputer is mounted may be a multi-board or may be a combination of single boards.

Further, the configurations, functions, and so forth described above may be implemented partly or entirely by hardware, for example, by designing them as an integrated circuit or the like. Further, the configurations, functions, and so forth described above may be implemented by software through interpretation and execution of a program for allowing a processor (microcomputer) to implement the individual functions. Information of the program for implementing the functions, tables, files, and so forth can be retained in a memory, a recording device such as a hard disk or an SSD (Solid State Drive), or a recording medium such as an IC card, an SD card, or a DVD.

It is to be noted that the embodiment of the present invention may have such modes as described below.

(1) A communication system including a server and a client, in which the server establishes connection to the client by non-IP communication, the server includes a proxy agent, the proxy agent transmits information relating to reception of a service from the server, to the client through a non-IP communication channel, and the client issues an inquiry about a service to a service registry.

(2) The communication system according to (1), in which the information relating to reception of a service is information with which a specific communication destination such as a physical address or a port number of the server side can be determined.

(3) A communication system including a first server, a second server, and a client, in which the first server establishes connection to the client by a first communication channel for IP communication, the second server establishes connection to the client by a second communication channel for non-IP communication, the second server includes a proxy agent, the proxy agent transmits information relating to reception of a service from the second server, to the client through the second communication channel, and the client issues an inquiry about a service to a service registry.

(4) A communication system including a first server, a second server, and a client, in which the first server and the second server establish connection to the client by non-IP communication, the first server and the second server individually include a proxy agent, the proxy agent transmits information relating to reception of a service from the first server and the second server, to the client by non-IP communication, and the client issues an inquiry about a service to service registry.

(5) The communication system according to (3) or (4), in which a timing at which the proxy agent performs transmission of service-server information is a timing at which a second server detects a failure of a first server, the first server and the second server forming a redundant configuration having a same function.

According to (1) to (5) above, service-oriented communication also with a connection destination performing non-IP communication becomes possible without intervention of a process for performing data conversion many times and without having an influence on a processing performance.

DESCRIPTION OF REFERENCE CHARACTERS 10A, 10B: ECU
1A, 1B, 1D: Server
2: Client
11A, 11B, 11C, 11D: Memory
12A, 12B, 12C: CPU
13A, 13B: Communication channel
14A, 14B, 14C: Communication network
17A, 17B, 17D: Proxy agent
111A, 111B, 111D: Service information
112A, 112B, 112C, 112D: Server information
113A, 113B, 113D: Service provision program
114A, 114B, 114C, 114D: Service registry
117: Service execution program
200: Front camera
202: Vehicle
250A, 250B: Front side camera

The invention claimed is:

1. A communication system comprising a first server, a second server, and a client, wherein
the second server
transmits second server information indicative of an address of the second server to the client through a non-internet protocol communication channel, and
the client
includes a registry into which the second server information transmitted from the second server is stored, and
acquires the second server information from the registry and requests the second server corresponding to the address indicated by the second server information for a service to be provided by the second server, wherein the address is a physical address,
the first server transmits first server information indicative of an IP address of the first server to the client through an internet protocol communication channel,
the first server information is stored into the registry, and
the client acquires the first server information from the registry and requests the first server corresponding to the IP address indicated by the first server information for a service to be provided by the first server.

2. The communication system according to claim 1, wherein
the first server
transmits first server information indicative of a physical address of the first server to the client through a non-IP communication channel,
the first server information is stored into the registry, and
the client
acquires the first server information from the registry and requests the first server corresponding to the physical address indicated by the first server information for a service to be provided by the first server.

3. The communication system according to claim 1, wherein
the first server and the second server have a same function,
the second server
transmits the second server information to the client through a non-IP communication channel at a timing at which a failure of the first server is detected, and
the client
requests the second server for a service when a service is not provided from the first server.

4. The communication system according to claim 1, wherein
the second server information
includes a port number, and
the client
requests a port of the second server, the port corresponding to the port number, for the service.

5. The communication system according to claim 1, wherein
the second server
transmits second service information indicative of a service to be provided by the second server, to the client through a non-IP communication channel,
the second service information is stored into the registry, and
the client
acquires the second service information from the registry and requests the second server corresponding to an address indicated by the second server information for a service indicated by the second service information.

6. The communication system according to claim 1, wherein
the first server
is connected to a first sensor that performs IP communication and
provides a service relating to an output value of the first sensor, and
the second server
is connected to a second sensor that performs non-IP communication and
provides a service relating to an output value of the second sensor.

7. An electronic control device, wherein the communication system according to claim 1 is accommodated in one housing.

8. A communication method executed by a communication system including a first server, a second server, and a client, the method comprising:
by the second server
transmitting second server information indicative of an address of the second server to the client through a non-internet protocol communication channel; and
by the client,
including a registry into which the second server information transmitted from the second server is stored, and
acquiring the second server information from the registry and requesting the second server corresponding to the address indicated by the second server information for a service to be provided by the second server, wherein the address is a physical address,
the first server transmits first server information indicative of an IP address of the first server to the client through an internet protocol communication channel,
the first server information is stored into the registry, and the client acquires the first server information from the registry and requests the first server corresponding to the IP address indicated by the first server information for a service to be provided by the first server.

* * * * *